United States Patent Office 3,510,465
Patented May 5, 1970

3,510,465
PROCESS FOR POLYMERIZING OLEFINIC HYDROCARBONS
Koohei Nakaguti, Tatuo Ando, Masaaki Hirooka, and Tosimiti Huzita, Niihama-shi, Japan, assignors to Sumitomo Chemical Company, Ltd., Osaka, Japan, a corporation of Japan
No Drawing. Filed Nov. 7, 1961, Ser. No. 150,646
Claims priority, application Japan, Nov. 11, 1960, 35/45,292, 35/45,296, 35/45,297
Int. Cl. C08f 1/56, 3/10
U.S. Cl. 260—93.7    9 Claims

ABSTRACT OF THE DISCLOSURE

In the polymerization of propylene with a catalyst consisting of an alkylaluminum dihalide and titanium trichloride, the addition of a urea compound selected from urea derivatives, thiourea and thiourea derivatives results in the selective production of crystalline polypropylene having a remarkably high stereospecificity.

---

The present invention relates to a process for producing the crystalline high polymers of olefinic hydrocarbon. Particularly this invention relates to a process for the production of crystalline high polymer from olefinic hydrocarbon by the aid of a highly active catalyst comprising an oxygen- or sulfur-containing organic compound selected from aluminum alcoholates, ethers, urea derivatives, thiourea and thiourea derivatives, in combination with a transition heavy metal halide and an alkylaluminum dihalide.

A method for the preparation of highly crystalline polymer of olefinic hydrocarbon by the aid of a catalyst system comprising a combination of a transition heavy metal halide, e.g. titanium chloride, with trialkylaluminum or dialkylaluminum chloride has been proposed heretofore. However, the combination of such transition metal halide with alkylaluminum dihalide which is one of essential component of the present invention has never been proposed for the production of the highly crystalline polymers of olefinic hydrocarbon, particularly of stereoregular, high polymer of propylene.

The present inventors have confirmed that a catalyst system which comprises the combination of transition heavy metal halide with alkylaluminum dihalide has very poor activity for polymerizing propylene. Furthermore, the substantial portion of the resulted polymer is merely oily or greasy amorphous lower polymerizate of propylene, and this fact apparently indicates that the said catalyst system is unadaptable as the catalyst for the preparation of stereoregular polymer of hydrocarbons. In this regards, G. Gaylord and H. F. Mark, in "Linear and Stereoregular Addition Polymers" (published by Interscience Publishers Inc., New York, 1959), also disclosed that the yield of desired isotactic polymer decreases in response to the degree of substitution of the alkyl portion of metal alkyl with halogen. Accordingly, it may be considered that alkylaluminum dihalide having two halogen atoms has increased cationic property as aluminum chloride has, and so it usually is disadvantageous for use in the stereoregular polymerization of olefinic hydrocarbon.

In our attempt to have such alkylaluminum dihalide converted into an effective component of the stereospecific polymerization catalyst, surprisingly it has now been found that the combination of the alkylaluminum dihalide with a certain oxygen- or sulfur-containing organic compound can provide new species of catalysts system which allow to produce a substantially crystalline polymeric product at a high polymerization rate. Thus, the present invention provides a process for the production of highly crystalline polymers of olefinic hydrocarbon by the use of a catalyst comprising a stereospecific catalyst-forming agent that is an oxygen- or sulfur-containing organic compound selected from aluminum alcoholates, ethers, urea derivatives, thiourea and thiourea derivatives, in combination with transition heavy metal halide and alkylaluminum dihalide.

Thus, an object of the invention is to provide a novel method for producing stereo-specific polymers by use of a novel ternary catalyst system. Another object is to provide such method by use of alkylaluminum dihalide as one of the catalyst constituents, which has been in turn considered not to be a component of the Ziegler type catalyst. Still another object is to provide a method for polymerizing olefins by use of the alkylaluminum dihalide, which is lower toxic, non-flammable, low-priced, and easily preparable, as compared with the conventional organoaluminum compounds, such as trialkylaluminum and dialkylaluminum halide, as the catalyst constituent. Other objects and natures of the present invention will be apparent from the following description.

Suitable as the transition heavy metal halides used herein are the halides of heavy metals of Groups IV to VI and VIII in the Periodic Table, including titanium halides, zirconium halides, vanadium halides, chromium halides, iron halides, etc. Particularly, titanium halides, zirconium halides and vanadium halides are preferred. These halides may be in various states having different valencies, but it is usually preferable to employ the halides having a lower valency than the highest one.

The reduction of the halides to those having a lower valency can be carried out in any suitable manner. Typically, such reduction can be effected by means of reducing agents including hydrogen, aluminum, titanium or an organometallic compound. Occasionally, a complex comprising reducing agent used may be formed according to the type of the said reducing agent. Such reduction product which is referred to as the complex also can be involved in the class of the transition heavy metal halides usable in the present invention.

The suitable alkylaluminum dihalides are those in which halogen is fluorine, chlorine, bromine or iodine. Particularly preferable are lower alkylaluminum dichloride compounds, such as ethylaluminum dichloride, isobutylaluminum dichloride, etc.

One class of oxygen- or sulfur-containing organic compounds which is a stereospecific catalyst-forming agent is aluminum alcoholate having the general formula $Al(OR^1)_{3-n}R^2_n$ wherein $R^1$ means alkyl radical, $R^2$ means hydrogen atom or alkyl radical and $n$ is an integer selected from 0, 1 and 2. Such aluminum alcoholate compound should be those which have at least one alkyl group connected to aluminum atom through oxygen atom. Particularly suitable are those which have three alkyl groups defined above, e.g. lower alkyl alcoholates such as $Al(OC_2H_5)_3$.

Another class of oxygen- or sulfur-containing compounds which are suitable as stereospecific catalyst-forming agent of the present invention is acyclic and cyclic ethers, the former being of the general formula $R^3OR^4$, wherein $R^3$ and $R^4$ individually mean alkyl, aryl, aralkyl and cycloalkyl radicals, typically including dimethyl ether, diethyl ether, dipropyl ether, dibutyl ether, dihexyl ether, diphenyl ether, dicyclohexyl ether, etc.; the latter can include furan, tetrahydrofuran, dioxane, etc.

Still another class of oxygen- or sulfur-containing compounds which are suitable as stereospecific catalyst-forming agent of the present invention is urea derivatives represented by any of the following general formulas

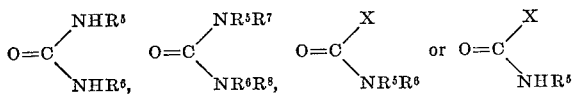

wherein $R^5$, $R^6$, $R^7$ and $R^8$, same or different, are alkyl, aryl, aralkyl, cycloalkyl or the like hydrocarbon radical and X is halogen.

Still another class of oxygen- or sulfur-containing organic compounds which are suitable as a stereospecific catalyst-forming agent of the present invention is thiourea and the derivatives thereof which include sulfur atom instead of the oxygen atom of $O=C<$ bond in the above-mentioned urea derivatives. Particularly suitable are N,N,N′,N′-tetrasubstituted thiourea derivatives.

In carrying out the present invention in practice, the molar ratio between transition heavy metal halide and alkylaluminum dihalide may be varied within the wide range of from 10:1 to 1:20, but preferably it should be selected within the range of from 2:1 to 1:10. The molar ratio between the oxygen- or sulfur-containing organic compound as a stereospecific catalyst-forming agent of the present invention and alkylaluminum halide usually is kept less than 2:1, and preferably it should be less than 1:1.

The method for mixing the essential components of the catalyst of the present invention, e.g. the sequence for mixing these components as well as the mixing temperature, is not limited in any way. For the intended purpose, however, it is preferable to mix alkylaluminum dihalide with the above-indicated oxygen- or sulfur-containing organic compound to result a mixture followed by the addition of a transition heavy metal halide. Mixing of these components may be effected in a suitable diluent which is an inert hydrocarbon solvent, e.g. hexane, heptane, octane, etc.

In accordance with a process of the present invention, α-olefinic hydrocarbon, such as ethylene, propylene, butene-1, styrene, etc., can be polymerized to have the corresponding solid polymer. The polymerization of propylene, butene-1, styrene, etc., by the aid of a catalyst of the invention is particularly interesting because it allows to produce desired stereoregular polymer.

In carrying out the present invention in practice, the polymerization temperature generally may be within the range of from 0° C. to 150° C., and preferably it is kept at a temperature of from room temperatures to 100° C. Polymerization pressure should preferably be kept at a pressure of less than 100 atm. and particularly of from atmospheric pressure to 30 atm. Suitable as medium for the intended polymerization is an inert hydrocarbon solvent, e.g. hexane, heptane, benzene, xylene, etc.

The polymer, particularly the stereospecific polymer, obtained according to the present invention is effectively employed for manufacture of various articles, such as film, fiber, and other shaped articles.

Now the present invention will be explained in detail in connection with the following examples, without limiting the scope thereto.

EXAMPLE 1

A 1000 ml. stainless steel autoclave equipped with a stirrer was substituted with nitrogen, and then 400 ml. of heptane was charged thereinto. 13.7 ml. of preliminarily 20% heptane solution of ethylaluminum dichloride was charged thereto. Aluminum ethylate in an amount of 0.6 mole per mole of the ethylaluminum dichloride is flowed with a small amount of heptane into said autoclave. Then, 3.33 g. titanium trichloride was flowed with a small amount of heptane into the autoclave. The catalyst mixture thus obtained comprises titanium trichloride, ethylaluminum dichloride and aluminum ethylate at the molar ratio of 1:1:0.6. Finally, heptane was added thereto in an amount sufficient to have the total heptane amount of 500 ml. in the resulting mixture. While stirring the mixture, its temperature was raised up to 70° C. by circulating hot water in the jacket of the autoclave, and then propylene was introduced until the internal pressure of this autoclave reached the pressure of 5 atm. gauge. As decrease in the pressure occurred upon initiation of the polymerization, propylene should be continuously supplied to maintain the above-mentioned pressure during the polymerization. The advance of the polymerization can be traced by decrease of weight of propylene in a cylinder. Two hours after the commencement of the polymerization, the feed of propylene is terminated, and then propylene in the autoclave is purged. The resulting polymeric product, in situ or after separation from heptane, was treated with methanolic hydrochloric acid and then washed well with methanol. It was then dried in vacuo at 50° C. 50.02 g. of white powdered polypropylene was obtained, the average molecular weight of which was $46.1 \times 10^4$. The polymeric product was subjected to fractional extraction with heptane by means of Soxhlet's extractor, whereby 92.3% of insoluble polymer was obtained which was identified as highly crystalline, helical-structured polypropylene from the results of through X-ray diffraction and infra-red absorption analysis.

The polymerization of propylene was repeated under the same conditions as above, but using no aluminum ethylate. The polymerization could proceed only at a very low velocity, and two hours later, the resulting polymer weighed only 2.7 g. A major portion of this product was an oily amorphous lower polymerizate, and boiling heptane-insoluble polymer was only 8.6%.

EXAMPLE 2

The procedure of Example 1 was repeated, with excepting that aluminum isopropylate was used instead of aluminum ethylate and polymerization temperature was 85° C. After the polymerization reaction for 2 hours, 52.7 g. of white powdered polypropylene was obtained. Through extraction with boiling heptane, the highly crystalline polymer obtained was 93.4%.

EXAMPLE 3

The procedure of Example 1 was repeated with exception that ethylaluminum dipropylate ($Al(OC_3H_7)_2C_2H_5$) was used instead of aluminum ethylate. After the polymerization reaction for 2 hours, 61.4 g. of white powdered polypropylene product was obtained. After extraction with boiling heptane, the resulting extraction residue was 92.6%, based upon the weight of the said product.

EXAMPLE 4

Into 850 ml. stainless steel autoclave with a rotary blade-type stirrer, the content of which had been substituted with nitrogen, 300 ml. of heptane was charged. 13.7 ml. of preliminarily prepared 20% heptane solution of ethylaluminum dichloride also was charged. While stirring the mixture well, diethyl ether in an amount of ½ mole per mole of the ethylaluminum dichloride was added thereto. Together with a small amount of heptane, 3.31 g. of titanium trichloride, prepared, by reduction with hydrogen, was flowed into the autoclave. Then, an additional amount of heptane was introduced to give the total heptane amount of 400 ml. in the resulting mixture.

The internal temperature of the autoclave was raised up to 70° C. by circulating hot water through the jacket of this autoclave, and thereafter propylene was charged from a propylene cylinder into the autoclave until the internal pressure reached at 5 atm. gauge. As pressure decreased during the polymerization, an addition amount of propylene was supplied continuously by controlling a needle valve so as to maintain the determined pressure, 5 atm. gauge, during the reaction. Two hours after, the reaction was stopped, and the unreacted propylene was purged. The resulting mixture was treated with methanol-hydrochloric acid mixture, washed well with methanol, and then vacuum-dried at 50° C. 27.8 g. of polypropylene was obtained, the average molecular weight of which was 55.4×10⁴. Through X-ray diffraction and infra-red absorption analysis, it was identified as being highly crystalline polyproplene. After extraction with boiling heptane by means of Soxhlet's extractor, boiling heptane-insoluble polypropylene was found to be 89.3%.

The polymerization of propylene was repeated under the same conditions as above, but using no ethyl ether. After 10 hours, only 14 g. of a polymeric product was obtained. Moreover, the main portion of this product was an oily amorphous lower polymerizate and only 0.2% of the whole was boiling heptane-insoluble.

EXAMPLE 5

The same procedure of Example 4 was repeated, with exception that tetrahydrofuran was used instead of ethyl ether. After the polymerization reaction for 2 hours, 37.8 g. of white powdered polypropylene was obtained, the average molecular weight of which was 55.4×10⁴. X-ray diffraction analysis indicates that this polypropylene was highly crystalline, and infra-red absorption analysis showed that the polypropylene had high stereoregularity in its helical structure. When the polypropylene was extracted with boiling heptane, heptane-insoluble polypropylene was found to be 91.6%. This means that the present invention can produce polypropylene which does not necessitate separation from amorphous portion.

EXAMPLE 6

Into a 800 ml. stainless steel-made autoclave with a stirrer, the content of which had been substituted with nitrogen, 300 ml. of purified heptane was charged. While stirring, 1.253 g. of tetramethylurea and 13.7 ml. of preliminarily prepared 20% heptane solution of ethylaluminum dichloride were charged therein together with a small amount of heptane. Then, 3.33 g. of titanium trichloride was flowed with a small amount of heptane into the autoclave. An additional amount of heptane was added to give the total heptane amount of 400 ml. in the resulting mixture. The temperature of the content in the autoclave was raised up to 70° C. by circulating hot water through the jacket of the autoclave. From a propylene cylinder, propylene was led through a needle valve into the autoclave until the internal pressure reached 5 atm. gauge. As pressure decreased during the reaction, an additional amount of propylene was supplied continuously by controlling the needle valve so as to effect the reaction under a constant pressure of 5 atm. gauge. The amount of reacted propylene was traced by measuring the decrease in weight of propylene stock in the cylinder. After 1.5 hours, the reaction was stopped, and unreacted propylene in the autoclave was purged. The resulting reaction product was treated with methanol and then with methanol-hydrochloric acid mixture, washed well with methanol, and dried at 50° C. in vacuum. 36.45 g. of white powdered polypropylene was obtained, the average molecular weight of which was 38.6×10⁴. The X-ray diffraction of the product indicated that this product was highly crystalline polypropylene, and the infra-red absorption spectrum showed that the polypropylene had high stereo-regularity in its helical structure. After extraction of this polypropylene with boiling heptane, heptane-insoluble polypropylene was found to be 93.1% in yield.

The polymerization of propylene was repeated under the same conditions as above, but not using tetramethylurea. After 10 hours, only 10.8 g. of propylene have been reacted. The major portion of the resulting polymeric product was found to be a greasy amorphous lower polymerizate. The solid polymer portion formed in a very little amount was extracted by means of Soxhlet's extractor. The yield of heptane-insoluble polyproplyene was only 9.6%.

EXAMPLE 7

The same procedure as in Example 6 was repeated with exception that thiourea was used instead of tetramethylurea. After continuing the polymerization reaction for 5 hours, 11.6 g. of white powdered polypropylene was obtained, the average molecular weight of which was 64.0×10⁴. When it was extracted with boiling heptane, heptane-insoluble propylene could be recovered in a highly increased yield (87.2%) as compared with that which was obtained by the use of a thiourea-free catalyst (9.6%, see Example 1).

EXAMPLE 8

The same procedure as in Example 6 was repeated with exception that N,N'-diphenylurea was used instead of tetramethylurea. After continuing the polymerization reaction for 5 hours, 13.3 g. of white powdered polypropylene was obtained, the average molecular weight of which was 74.3×10⁴. Boiling heptane-insoluble polypropylene was 82.8% in yield.

EXAMPLE 9

The same procedure as in Example 6 was repeated with exception that N-dimethylcarbamyl chloride was used in place of tetramethylurea. After the polymerization reaction for 2 hours, 26.0 g. of white powdered polypropylene was obtained, the average molecular weight of which was 42.3×10⁴. Undissolved portion after boiling heptane-extraction was 90.2% based on the weight of the total polymeric product.

We claim:

1. A process of producing crystalline polypropylene, which comprises contacting propylene with a catalyst essentially containing titanium trichloride, an alkylaluminum dihalide and an organic compound defined as a stereospecific catalyst-forming agent, thereby to effect polymerization of the said propylene, the said stereospecific catalyst-forming agent being selected from the group consisting of (1) urea derivative of any one of the general formulas

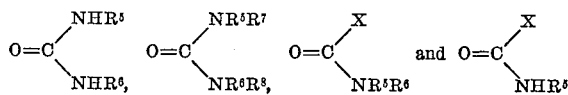

wherein R⁵, R⁶, R⁷ and R⁸ individually are one member selected from alkyl, and aryl and X is halogen, (2) thiourea and (3) thiourea derivative of any one of the general formulas

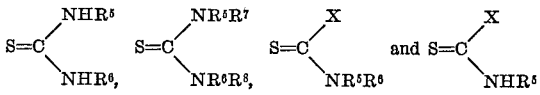

wherein R⁵, R⁶, R⁷ and R⁸ individually are one member selected from alkyl, and aryl and X is halogen.

2. A process according to the claim 1, wherein the said catalyst contains the organic compound and the alkylaluminum halide at the molar ratio of less than 2:1.

3. A process according to the claim 1, wherein the said catalyst contains the titanium trichloride and the alkylaluminum dihalide at the molar ratio of from 2:1 to 1:10.

4. A process according to claim 1, wherein the said catalyst is a mixture obtained by firstly mixing the alkylaluminum dihalide with the organic compound as stereospecific catalyst-forming agent and then adding to the resulting mixture the titanium trichloride.

5. A process according to the claim 1, wherein the said polymerization is carried out at a temperature of less than 150° C., and under a pressure of less than 100 atm.

6. A process according to the claim 1, wherein the said polymerization is carried out in the presence of a liquid saturated hydrocarbon at a temperature from about 50° to 100° C., and at a pressure from about 1 to 30 atmospheres.

7. A process according to the claim 1, wherein the said alkylaluminum dihalide is ethylaluminum dichloride.

8. A process according to the claim 1, wherein the said organic compound as stereospecific catalyst-forming agent is one member selected from the group consisting of tetramethylurea, N,N′-diphenyl urea and N-dimethylcarbamyl chloride.

9. A polymerization catalyst, consisting essentially of an aluminum dihalide having the formula $RAlX_2$ wherein R is a hydrocarbon radical and X is a halogen atom, a lower valency titanium halide, and as a third component at least one tetraalkylthiourea having the formula $(R'R''N)_2CS$ wherein R′ and R″ are each alkyl groups.

References Cited

UNITED STATES PATENTS 3,213,073  10/1965  Coover et al. _____ 260—93.7

JOSEPH L. SCHOFER, Primary Examiner

E. J. SMITH, Assistant Examiner

U.S. Cl. X.R.

252—429; 260—93.5, 94.9